United States Patent
Zhang

(10) Patent No.: US 9,967,772 B1
(45) Date of Patent: May 8, 2018

(54) SYSTEMS AND METHODS FOR SUPPRESSING INTERFERENCE IN A WIRELESS COMMUNICATION SYSTEM

(71) Applicant: Marvell International Ltd., Hamilton (BM)

(72) Inventor: Hongyuan Zhang, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days. days.

(21) Appl. No.: 15/228,361

(22) Filed: Aug. 4, 2016

Related U.S. Application Data

(63) Continuation of application No. 14/739,068, filed on Jun. 15, 2015, now Pat. No. 9,425,921, which is a
(Continued)

(51) Int. Cl.
*H04B 1/10* (2006.01)
*H04W 28/04* (2009.01)
(Continued)

(52) U.S. Cl.
CPC ........ *H04W 28/048* (2013.01); *H04B 7/0413* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 6,826,240 B1 | 11/2004 | Thomas et al. | |
| 7,525,942 B2 * | 4/2009 | Cordone | H04B 1/1036 370/310 |

(Continued)

FOREIGN PATENT DOCUMENTS

| | | |
|---|---|---|
| CN | 1998175 | 7/2007 |
| CN | 101479958 | 7/2009 |

(Continued)

OTHER PUBLICATIONS

Notice of Allowance dated Oct. 8, 2014 in related/corresponding U.S. Appl. No. 13/654,925, filed Oct. 18, 2012.
(Continued)

*Primary Examiner* — Adolf Dsouza

(57) ABSTRACT

Receiving devices and methods for suppressing interference from a data signal received at a receiving device are provided. The receiving device has m receive antennas. A training signal set transmitted from a first transmitting device is received at the receiving device. The training signal set includes (i) data for each transmit antenna of n transmit antennas included on the first transmitting device and (ii) information sufficient to determine a channel estimate corresponding to a communication channel between the first transmitting device and the receiving device. The channel estimate is determined based on the training signal set. The channel estimate includes an m-by-n description of the communication channel. The data signal received at the receiving device is filtered based on the channel estimate to suppress the interference in the data signal. The data signal is transmitted from a second transmitting device different from the first transmitting device.

20 Claims, 9 Drawing Sheets

Related U.S. Application Data continuation of application No. 14/327,878, filed on Jul. 10, 2014, now Pat. No. 7,071,474.

(60) Provisional application No. 61/858,470, filed on Jul. 25, 2013.

(51) Int. Cl.
*H04B 7/0413* (2017.01)
*H04W 92/18* (2009.01)

(56) References Cited

U.S. PATENT DOCUMENTS

| | | | |
|---|---|---|---|
| 7,532,864 | B2 | 5/2009 | Fukuoka et al. |
| 7,599,332 | B2 | 10/2009 | Zelst et al. |
| 7,630,688 | B2 | 12/2009 | Zeira |
| 7,639,729 | B2 | 12/2009 | Pan et al. |
| 7,697,602 | B2 | 4/2010 | Frey et al. |
| 7,738,530 | B2 | 6/2010 | Thomas |
| 7,742,390 | B2 | 6/2010 | Mujtaba |
| 7,822,101 | B2 | 10/2010 | Reial |
| 7,835,700 | B2 | 11/2010 | Zeira |
| 8,144,647 | B2 | 3/2012 | Nabar et al. |
| 8,270,909 | B2 | 9/2012 | Zhang et al. |
| 8,275,337 | B2 | 9/2012 | Tong et al. |
| 8,289,869 | B2 | 10/2012 | Sawai |
| 8,339,978 | B2 | 12/2012 | Sawai et al. |
| 8,462,863 | B1 | 6/2013 | Zhang et al. |
| 8,498,362 | B2 | 7/2013 | Zhang et al. |
| 8,503,291 | B1 | 8/2013 | Lee et al. |
| 8,526,351 | B2 | 9/2013 | Fischer et al. |
| 8,526,892 | B2 | 9/2013 | Zhang et al. |
| 8,542,589 | B2 | 9/2013 | Surineni et al. |
| 8,599,804 | B2 | 12/2013 | Erceg et al. |
| 8,619,907 | B2 | 12/2013 | Mujtaba et al. |
| 8,625,701 | B2 | 1/2014 | Zhang et al. |
| 8,630,376 | B1 | 1/2014 | Zhang |
| 8,644,412 | B2 | 2/2014 | Jia et al. |
| 8,699,978 | B1 | 4/2014 | Nabar et al. |
| 8,724,720 | B2 | 5/2014 | Srinivasa et al. |
| 8,737,501 | B2 | 5/2014 | Shah et al. |
| 8,787,841 | B2 | 7/2014 | Ketchum et al. |
| 8,867,653 | B2 | 10/2014 | Zhang et al. |
| 8,948,283 | B2 | 2/2015 | Zhang |
| 9,621,322 | B2 | 4/2017 | Zhang |
| 2006/0018394 | A1 | 1/2006 | van Zelst et al. |
| 2007/0121749 | A1 | 5/2007 | Frey et al. |
| 2007/0298742 | A1 | 12/2007 | Ketchum et al. |
| 2009/0196163 | A1 | 8/2009 | Du |
| 2009/0310724 | A1* | 12/2009 | Shah .............. H04B 7/0854 375/346 |
| 2009/0322613 | A1 | 12/2009 | Bala et al. |
| 2010/0046453 | A1 | 2/2010 | Jones et al. |
| 2010/0046656 | A1 | 2/2010 | van Nee et al. |
| 2010/0087151 | A1 | 4/2010 | Auer |
| 2010/0260138 | A1 | 10/2010 | Liu et al. |
| 2010/0260159 | A1 | 10/2010 | Zhang et al. |
| 2010/0272207 | A1 | 10/2010 | Zangi et al. |
| 2011/0002219 | A1 | 1/2011 | Kim et al. |
| 2011/0116488 | A1 | 5/2011 | Grandhi |
| 2012/0039196 | A1 | 2/2012 | Zhang |
| 2012/0195391 | A1 | 8/2012 | Zhang et al. |
| 2012/0201316 | A1 | 8/2012 | Zhang et al. |
| 2012/0275332 | A1 | 11/2012 | Seok et al. |
| 2012/0294294 | A1 | 11/2012 | Zhang |
| 2012/0300874 | A1* | 11/2012 | Zhang .............. H04L 5/0048 375/295 |
| 2013/0010632 | A1 | 1/2013 | Wang et al. |
| 2013/0102256 | A1* | 4/2013 | Cendrillon ........... H04B 7/08 455/63.4 |
| 2013/0182662 | A1 | 7/2013 | Zhang et al. |
| 2013/0322277 | A1 | 12/2013 | Vanganuru et al. |
| 2014/0003384 | A1 | 1/2014 | Zhang et al. |
| 2014/0029681 | A1 | 1/2014 | Zhang et al. |
| 2014/0112175 | A1 | 4/2014 | Pantelidoiu et al. |
| 2014/0233669 | A1 | 8/2014 | Aggarwal |

FOREIGN PATENT DOCUMENTS

| | | |
|---|---|---|
| EP | 1821445 | 8/2007 |
| JP | 2009543471 | 12/2009 |
| WO | 0113530 | 2/2001 |
| WO | 2010120692 | 10/2010 |
| WO | 2012122119 | 9/2012 |

OTHER PUBLICATIONS

Office Action dated Aug. 19, 2014 from related/corresponding U.S. Appl. No. 13/655,766, filed Oct. 19, 2012.

Draft Supplement to Standard [for] Information Technology Telecommunications and information exchange between systems Local and metropolitan area networks Specific requirements Part 11: Wireless LAN Medium Access Control (MAC) and Physical Layer (PHY) specifications: Further Higher Data Rate Extension in the 2.4 GHz band (Amendment to IEEE Std 802.11,1999 Edition), IEEE P802.11g/D8.2, Apr. 2003.

Gunnam, et al, "Multp-Rate layered Decoder Architecture for Block LDPC Codes of the IEEE 802.11 n Wireless Standard", ISCAS 2007: 1645-1648.

Draft Supplement to Standard [for] information Technology Telecommunications and information exchange between systems Local and metropolitan area networks Specific requirements Part 11: Wireless LAN Medium Access Control (MAC) and Physical Layer (PHY) specifications: Further Higher Data Rate Extension in the 2.4 GHz band (Amendment to IEEE Std 802.11,1999 Edition) IEEE Sid 802.11a-1999.

IEEE P802.11ac™/D2.1, "Draft Standard for Information Technology-Telecommunications and information exchange between systems-Local and metropolitan area networks-Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338), Mar. 2012.

802.11 b-1999/Cor 1-2001—IEEE Standard for Information Technology—Telecommunications and Information Exchange Between Systems—Local and Metropolitan Area Networks—Specific Requirement. Part 11: Wireless LAN Medium Access Control (MAC) and Physical Layer (PHY) Specifications. Amendment 2: Higher-Speed Physical Layer (PHY) Extension in the 2.4 GHz Band—Corrigendum 1 (Corrigendum to IEEE Std 802.11b-1999), Nov. 7, 2001.

International Search Report and Written Opinion of the International Searching Authority dated Apr. 3, 2013 for related/corresponding Appl. No. PCT/US12/060981 filed Oct. 19, 2012.

International Search Report and Written Opinion of the International Searching Authority dated Apr. 3, 2013 for related/corresponding Appl. No. PCT/US12/060804 filed Oct. 18, 2012.

Gallagher, Robert G, Stochastic Processes: Theory for Application: Chapter 10 Estimation, Cambridge University Press, 2013, ISBN 978-1-107-03975-9, pp. 478-511.

Ganti, Radha Krishna et al., Spatial and Temporal Correlation of the Interference in ALOHA Ad Hoc Networks, Department of Electrical Engineering, University of Notre Dame, Apr. 8, 2009, 7 pages.

Halperin, Daniel et al., 802.11 with Multiple Antennas for Dummies, University of Washington and Intel Labs Seattle, undated, 7 pages.

Salz Jacket al., Effect of Fading Correlation on Adaptive Arrays in Digital Mobile Radio, IEEE Transactions on Vehicular Technology vol. 43, No. 4, Nov. 1994, pp. 1049-1057.

Sadough, Seyed Mohammad-Sajad et al., Recent Developments in Channel Estimation and Detection for MIMO Systems, Chapter 6, undated, pp. 99-122.

Taricco, Giorgia et al., Space-Time Decoding with Imperfect Channel Estimation, IEEE Transactions on Wireless Communication, vol. 4, No. 4, Jul. 2005, pp. 1874-1868.

(56) References Cited

OTHER PUBLICATIONS

Werner, Stefan et al., Adaptive Multiple-Antenna Receiver for COMA Mobile Reception, Helsinki University of Technology, Laboratory of Telecommunications Technology, undated, 5 pages.
Partial International Search report in International Application No. PCT/US2012/038976, dated Aug. 22, 2012.
IEEE P802.11n™/03.00, "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc, pp. 1-544 (Sep. 2007).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
IEEE Std 802.11™ 2012 (Revision of IEEE Std 802.11-2007) IEEE Standard for Information technology—Telecommunications and information exchange between systems—Local and metropolitan area networks—Specic requirements Part 11: Wireless LAN Medium Access Control (MAC) and Physical Layer (PHY) specifications, The Institute of Electrical and Electronics Engineers, Inc., pp. 1-2793 (Mar. 29. 2012).
IEEE Std. 802.11n™ "IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., pp. 1-535 (Oct. 2009).
IEEE Std 802.11g/D2.8, May 2002 (Supplement to ANSI/IEEE Std 802.11, 1999 Edition) "Draft Supplement to Standard [for] Information technology-Telecommunications and information exchange between systems-Local and metropolitan area networks-Specific requirements—Part 11 : Wireless LAN Medium Access Control (MAC) and Physical Layer (PHY) specifications: Further Higher-Speed Physical Layer Extension in the 2.4 GHz Band," The Institute of Electrical and Electronics Engineers, Inc., pp. 1-53 (May 2002).
IEEE Std 802.11adD2.0 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-359 (Jan. 2012).
IEEE Std 802.11af/D1.05 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: TV White Spaces Operation," The Institute of Electrical and Electronics Engineers, Inc., pp. 1-123 (Nov. 2011).
Third Office Action in Chinese Patent Application No. 201280035739.5, dated Mar. 21, 2017, with English translation (8 pages).
Second Office Action in Chinese Patent Application No. 2012800357395, dated Sep. 19, 2016, with English translation (16 pages).
First Office Action in Chinese Application No. 2012800357395, dated Jan. 27, 2016, with English translation (11 pages).
Office Action in Japanese Application No. 2014-512946, dated Jan. 26, 2016, with English translation (6 pages).
International Preliminary Report on Patentability in Application No. PCT/US2012/038976, dated Dec. 5, 2013.
Chen et al., "IEEE P802.11, Wireless LANs, Proposed TGac Draft Amendment," IEEE P802.11-10/1361r3, 165 pages (Jan. 18, 2011).
Chen, "Home Network Basis: Transmission Environments and Wired/Wireless Protocols," Prentice Hall, pp. 1-26 (Jul. 2003).
de Vegt, "Potential Compromise for 802.11ah Use Case Document", Institute of Electrical and Electronics Engineers, doc. No. IEEE 802.11-11/0457r0, pp. 1-27 (Mar. 2011 ).
International Search Report and Written Opinion in International Application No. PCT/US2012/038976, dated Apr. 18, 2013.
Hiertz, et al., "The IEEE 802.11 Universe," IEEE Communications Magazine, pp. 62-70, (Jan. 2010).
Imashioya et al., "RTL Design of 1.2 Gbps MIMO WLAN System and Its Business Aspect," IEEE 9th Int'l Symposium on Communications and Information Technology (ISCIT 2009), The Institute of Electrical and Electronics Engineers, pp. 296-301 (2009).
Mujtaba, S.A. "IEEE P802.11—Wireless LANs, TGn Sync Proposal Technical Specification," The Institute of Electrical Electronics Engineers, Inc., doc.: IEEE 802.11-04/0889r6, pp. 1-131 (May 2005).
Park, "Proposed Specification Framework for TGah", The Institute of Electrical and Electronics Engineers, doc. No. IEEE 802.11—yy/xxxxr05, (Jan. 2012).
Park, "Proposed Specification Framework for TGah", The Institute of Electrical and Electronics Engineers, doc. No. IEEE 802.11-11/1137r6, pp. 1-13 (Mar. 2012).
Perahia et al., "Gigabit Wireless LANs: an overview of IEEE 802.11ac and 80211ad," ACM SIGMOBILE Mobile Computina and Communications Review, vo. 15, No. 3, pp. 23-33 (Jul. 2011 ).
Shi et al., "Phase Tracking During VHT-LTF," Doc. No. IEEE 802.11-10/0771r0, The Institute of Electrical and Electronics Engineers, Inc., pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011 ).
Stacey et al., "Specification Framework for TGac," document No. IEEE 802.11-09/0992r20, Institute for Electrical and Electronics Engineers, pp. 1-49, (Jan. 18, 2011 ).
Syafei et al., "A Design of Next Generation Gigabit MIMO Wireless LAN System," IEEE 12th Int'l Conference on Advanced Communication Technology (ICACT 2010), The Institute of Electrical and Electronics Engineers, pp. 941-46 (2010).
Syafei et al., "A Gigabit MIMO WLAN System with International Standardization Strategy," IEEE Int'l Symposium on Intelligent Signal Processing and Communication Systems (ISPACS 2009), The Institute of Electrical and Electronics Engineers, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).
Taghavi et al., "Introductory Submission for TGah", doc. No. IEEE 802.11-11/0062r0, Institute for Electrical and Electronics Engineers, pp. 1-5 (Jan. 14, 2011 ).
van Nee et al. "The 802.11 n MIMO-OFDM Standard for Wireless LAN and Beyond," Wireless Personal Communications, vol. 37, pp. 445-453 (Jun. 2006).
van Zelst et al., "Pilot Sequence for VHT-DAT A," Doc. No. IEEE 802.11-10/0811r1, The Institute of Electrical and Electronics Enaineers, Inc., pp. 1-10 (Jul. 2010).
Vermani et al. "Preamble Format for 1 MHz," The Institute of Electrical and Electronics Engineers, doc, No. IEEE 802.11-11/1482r2, pp. 1-30 (Nov. 2011).
Vermani, et al. "Spec Framework Text for PHY Numerology," The Institute of Electrical and Electronics Engineers, doc. No. IEEE 802.11-11/1311r0, pp. 1-5 (Sep. 2011 ).
Yu et al., "Coverage extension for IEEE802.11ah," The Institute of Electrical and Electronics Engineers, doc. No. IEEE 802.11-11/0035r1, pp. 1-10 (Jan. 2011 ).
Zhang et al., "11ac Explicit Sounding and Feedback", The Institute of Electrical and Electronics Engineers, doc. No. IEEE 802.11-10/1105r0, 44 pages (Sep. 2010).

(56) References Cited

OTHER PUBLICATIONS

Zhang et al., "11ah Data Transmission Flow," The Institute of Electrical and Electronics Engineers, doc. No. IEEE 802.11-11/1484r1, pp. 1-15 (Nov. 2011).

Zhang et al., "1 MHz Waveform in Wider BW", The Institute of Electrical and Electronics Engineers, doc. No. IEEE 802.11-12/0309r1, pp. 1-10 (Mar. 2012).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, The Institute of Electrical and Electronics Engineers, Inc., pp. 1-532 (1999).

Office Action dated Jan. 28, 2014 from U.S. Appl. No. 13/477,920, filed May 22, 2012.

Office Action dated Aug. 3, 2016 from U.S. Appl. No. 14/612,176, filed Feb. 2, 2015.

Office Action dated Sep. 14, 2017 from U.S. Appl. No. 15/483,437, filed Apr. 10, 2017.

\* cited by examiner

SYSTEMS AND METHODS FOR SUPPRESSING INTERFERENCE IN A WIRELESS COMMUNICATION SYSTEM

CROSS-REFERENCE TO RELATED APPLICATIONS

This is a continuation of U.S. application Ser. No. 14/739,068, filed Jun. 15, 2015, which is a continuation of U.S. application Ser. No. 14/327,878, filed Jul. 10, 2014, which claims priority to U.S. Provisional Application 61/858,470, filed Jul. 25, 2013. All the above applications are hereby incorporated herein by reference.

TECHNICAL FIELD

The technology described in this patent document relates generally to wireless communications and more particularly to systems and methods for suppressing interference in a signal received at a receiving device.

BACKGROUND

In the field of wireless communications, SIMO (Single Input Multiple Output) and MIMO (Multiple Input Multiple Output) technologies have been used to achieve increased data throughput and link range without requiring additional bandwidth or increased transmission power. Both technologies utilize multiple receive antennas on a receiver to enable a multipath rich environment with multiple orthogonal channels existing between a transmitter and the receiver. Data signals can be transmitted in parallel over these channels, enabling increased data throughput and link range. Because of its advantageous properties, SIMO and MIMO technologies have been used in wireless communication standards such as IEEE 802.11n (WiFi), 4G, 3GPP Long Term Evolution (LTE), WiMAX, and HSPA+.

Despite the performance improvements enabled by SIMO and MIMO systems, interference in a data signal received by a receiving device may have a significant impact on throughput and reliability of data transmissions in these systems.

SUMMARY

The present disclosure is directed to receiving devices and methods for suppressing interference from a data signal received at a receiving device. In an example method for suppressing interference from a data signal received at a receiving device, the receiving device has m receive antennas. A training signal set transmitted from a first transmitting device is received at the receiving device. The training signal set includes data for each transmit antenna of n transmit antennas included on the first transmitting device. The training signal set includes information sufficient to determine a channel estimate corresponding to a communication channel between the first transmitting device and the receiving device. The channel estimate is determined based on the received training signal set, where the channel estimate includes an m-by-n description of the communication channel that is determined based on the data for each transmit antenna of the n transmit antennas. The data signal received at the receiving device is filtered based on the determined channel estimate to suppress the interference in the data signal. The data signal is transmitted from a second transmitting device that is different from the first transmitting device.

As another example, a receiving device includes m receive antennas, where one or more of the m receive antennas are configured to receive a training signal set transmitted from a first transmitting device. The training signal set includes data for each transmit antenna of n transmit antennas included on the first transmitting device, and the training signal set includes information sufficient to determine a channel estimate. The channel estimate corresponds to a communication channel between the first transmitting device and the receiving device. The receiving device also includes a channel estimation block configured to determine the channel estimate based on the received training signal set. The channel estimate includes an m-by-n description of the communication channel that is determined based on the data for each transmit antenna of the n transmit antennas. The receiving device further includes a filter that is configured to filter, based on the determined channel estimate, a data signal received at the receiving device to suppress the interference in the data signal. The data signal is transmitted from a second transmitting device that is different from the first transmitting device.

DETAILED DESCRIPTION

Figure 1:
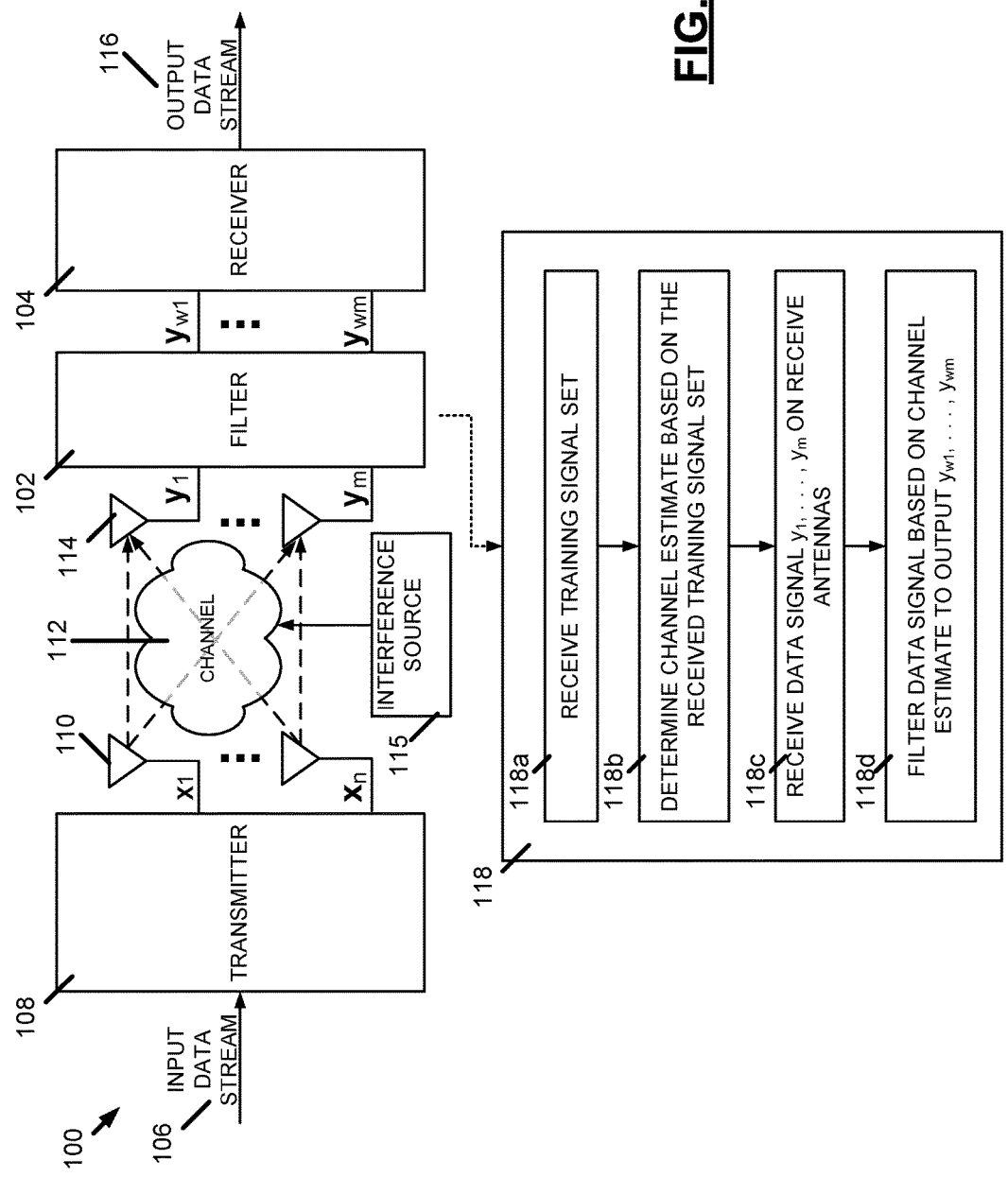
FIG. 1 is a block diagram of an example communications system utilizing an interference rejection filter to decrease interference in a data signal received by a receiver.

FIG. 1 is a block diagram of an example communications system 100 utilizing an interference rejection filter 102 to decrease interference in a data signal received at a receiver 104. In the example communications system 100 of FIG. 1, an input data stream 106 is received by a transmitter 108 and subsequently transmitted over a plurality of transmission antennas 110. The transmission antennas 110 transmit the input data stream 106 using a plurality of signals $x_1, \ldots, x_n$, where n is equal to a number of transmission antennas of the transmitter 108. The plurality of data signals $x_1, \ldots, x_n$ are transmitted via a channel 112 to a plurality of receive antennas 114 associated with the receiver 104. The receive antennas 114, the filter 102, and the receiver 104, along with any modules (e.g., channel estimation and equalizer modules) or processing components included in the filter 102 or the receiver 104, together comprise a receiving device that communicates with the transmitter 108 and other transmitting devices.

The channel 112 affects the plurality of signals $x_1, \ldots, x_n$ transmitted, such that modified versions of these signals, $y_1, \ldots, y_m$, are received on the receive antennas 114, where m is equal to the number of receive antennas 114 of the receiver 104. The received signals $y_1, \ldots, y_m$ on the receive antennas 114 are modified from the transmitted signals $x_1, \ldots, x_n$ due to properties of the channel 112, interference, and/or noise at the receive antennas 114. For example, interference is injected into the received signals $y_1, \ldots, y_m$ by an interference source 115. In an example, the interference source 115 is a wireless device transmitting to a wireless receiver other than receiver 104 (e.g., a WiFi STA communicating with a different base station, a mobile phone communicating with a different base station).

In an example, the interference source 115 is a transmitting device that is included in a basic service set (BSS) that is different from that of the receiver 104. Because the transmitting device is included in the BSS that is different from that of the receiver 104, the transmitting device is not configured to send regular packets to the receiver 104, and the transmitting device is thus identified as being a source of interference. In another example, the interference source 115 is a transmitting device that is a hidden node included in a same BSS as the receiver 104. In this example, the hidden node is similarly not configured to send regular data packets to the receiver 104, such that transmissions from the hidden node received at the receiver 104 comprise interference, and the hidden node is identified as being a source of interference.

The system 100 is described generally via the following equation:

$$y = Hx + z, \quad \text{(Equation 1)}$$

where H is a channel matrix that defines characteristics of the channel 112, x is a data matrix that defines the plurality of signals $x_1, \ldots, x_n$ transmitted by the transmitter 108, y is a data matrix that defines the plurality of signals $y_1, \ldots, y_m$ received on the receive antennas 114, and z is an interference-and-noise matrix that affects the transmission of the signals $x_1, \ldots, x_n$. In the examples noted above, where i) the interference source 115 is a transmitting device that is included in a BSS that is different from that of the receiver 104, or ii) the interference source 115 is a transmitting device that is a hidden node included in a same BSS as the receiver 104, the matrices y and H are each affected by the presence of the interference source 115. As noted above, the interference source 115 causes interference to be injected into the received signals $y_1, \ldots, y_m$, which affects the matrix y. The channel matrix H defines characteristics of the transmission channel between the transmitter 108 and the receiver 104, as well as characteristics of an interference channel between the interference source 115 and the receiver 104. As such, the matrix H is affected by the presence of the interference source 115.

To suppress the interference received at the receiver 104, the interference rejection filter 102 is used to filter the received signals $y_1, \ldots, y_m$ and output filtered signals $y_{w1}, \ldots, y_{wm}$ to the receiver 104. The filtered versions of the received signals, $y_{w1}, \ldots, y_{wm}$, have decreased interference versus their received counterparts $y_1, \ldots, y_m$. Using the filtered signals $y_{w1}, \ldots, y_{wm}$, the receiver 104 generates an output data stream 116. In an example, the output data stream 116 includes a summation of the filtered signals $y_{w1}, \ldots, y_{wm}$. In another example, the output data stream 116 is based on a different combination of the filtered signals $y_{w1}, \ldots, y_{wm}$.

As described in further detail below, the filtering performed by the interference rejection filter 102 suppresses interference in the received signals $y_1, \ldots, y_m$ based on an explicit sounding method. The explicit sounding method allows the receiving device to suppress interference in the received signals $y_1, \ldots, y_m$ via signal processing approaches (e.g., digital signal processing approaches) that are implemented by the interference rejection filter 102. The explicit sounding method described herein is thus used in performing interference avoidance at the receiving device and is in contrast to conventional sounding methods that are used in performing transmit beamforming at a transmitter.

To achieve interference suppression at the receiving device, the receiving device determines a channel estimate corresponding to a communication channel between the interference source 115 and the receiving device. For an OFDM-based WiFi system, the channel estimate corresponding to the communication channel between the interference source 115 and the receiving device includes a full-dimensional description of the communication channel with channel estimation information in each tone (i.e., each sub-carrier) used in the WiFi system. In an example where the interference source 115 includes n transmit antennas, the full-dimensional description of the channel between the interference source 115 and the receiving device provides an m-by-n description of the channel. In an example, the m-by-n description of the channel includes an m-by-n channel matrix, and in other examples, the m-by-n description is represented in various other forms. Although the interference source 115 is described herein as having the same number of transmit antennas as the transmitter 108 (i.e., n), the interference source 115 can include any number of transmit antennas. Thus, in an example where the interference source 115 includes p transmit antennas, the full-dimensional channel estimate provides an m-by-p description of the communication channel between the interference source 115 and the receiving device.

The sounding method used in determining the full-dimensional description of the communication channel between the interference source 115 and the receiving device differs from alternative interference suppression methods that do not utilize a sounding technique. For example, in one such alternative method that does not utilize a sounding technique, the channel between the interference source 115 and the receiving device is estimated by decoding regular packets that are sent by the interference source 115 to another intended receiver that is not the receiver 104. Although the interference source 115 does not intend to send such regular packets to the receiver 104 (e.g., the interference source 115 is included in a BSS that is different from that of the receiver 104), the receiver 104 nevertheless receives such packets at the receive antennas 114. Because these packets are not intended for receipt at the receiver 104, the packets comprise a source of interference at the receive antennas 114. In attempting to suppress such interference, the receiving device estimates the channel between the interference source 115 and the receiving device by decoding the received packets. The packets, however, lack sufficient training information to determine a full-dimensional description of the communication channel between the interference source 115 and the receiving device. In an example, the interference source 115 is an access point (AP) having four antennas, but this AP transmits only one-stream, two-stream, or three-stream packets to its intended client receivers. Therefore, when the receiving device of FIG. 1 receives these packets and uses the packets in estimating the communication channel between the interference source 115 and the receiving device, the receiving device is unable to determine a full-dimension (i.e., m-by-4) channel estimation and instead determines only m-by-1, m-by-2, or m-by-3 channel estimations.

The explicit sounding method disclosed herein allows a full-dimensional channel estimation to be made for the communication channel between the interference source 115 and the receiving device. As described in further detail herein, the sounding method allows the full-dimensional channel estimate to be made on the basis of sounding packets that are transmitted from the interference source 115 to the receiving device. Such sounding packets include a training signal set that includes data (e.g., long training fields) for each transmit antenna included on the interference source 115. The interference rejection filter 102 performs interference suppression based on the processing of the sounding packets.

Specifically, the interference rejection filter 102 suppresses interference in a signal received at the receiving device by performing steps 118 illustrated in FIG. 1. At 118a, the receiving device receives a training signal set transmitted from the interference source 115. The training signal set is included in a packet, such as a sounding packet, a null data packet, or another type of packet. The training signal set includes data for each transmit antenna included at the interference source 115, and the training signal set includes information sufficient to determine a full-dimensional channel estimate corresponding to a communication channel between the interference source 115 and the receiving device. In an example, the training signal set is included in a sounding packet that is transmitted from the interference source 115 to the receiving device, and the data for each transmit antenna of the interference source 115 comprises long training fields (LTFs) or extended long training fields (E-LTFs) that are included in a preamble portion of the sounding packet.

At 118b, a channel estimation module included in the receiving device determines the full-dimensional channel estimate based on the received training signal set. In an example where the interference source 115 includes n transmit antennas, the full-dimensional channel estimate includes an m-by-n description of the communication channel that is determined based on the data for each of the n transmit antennas. At 118c, the filter 102 receives data signals $y_1, \ldots, y_m$ on the receive antennas 114, where the data signals $y_1, \ldots, y_m$ include interference data from the interference source 115. In an example, the received data signals $y_1, \ldots, y_m$ comprise data sent from a transmitter (e.g., transmitter 108) that is included in a same BSS as the receiving device, along with the aforementioned interference data from the interference source 115.

At 118d, based on the determined full-dimensional channel estimate, the filter 102 filters the data signals $y_1, \ldots, y_m$ to output filtered versions of the signals $y_{w1}, \ldots, y_{wm}$. The filtered versions of the signals $y_{w1}, \ldots, y_{wm}$ have decreased interference, as the filtering procedure is configured to suppress the interference caused by the interference source 115. The filtered signals $y_{w1}, \ldots, y_{wm}$ are output by the interference rejection filter 102 and transmitted to the receiver 104. Thus, the steps 118 are used to determine the full-dimensional channel estimate for the communication channel between the interference source 115 and the receiving device and to filter the received data signals $y_1, \ldots, y_m$ based on this channel estimate, such that interference is removed from the data signals $y_1, \ldots, y_m$. As noted above, the sounding method used in suppressing the interference at the receiving device differs from alternative methods that use a sounding method for performing transmit beamforming. The sounding method disclosed herein may be used in a Wireless Local Area Network (WLAN) system (e.g., employing one or more Institute of Electrical and Electronics Engineers (IEEE) 802.11 standards such as 802.11a, 802.11b, 802.11g, 802.11n, 802.11ac). Further, the sounding method disclosed herein may be used in wireless communication systems utilizing 2.4 GHz or 5 GHz frequency bands (e.g., high efficiency WiFi (HEW) systems).

Figure 2:
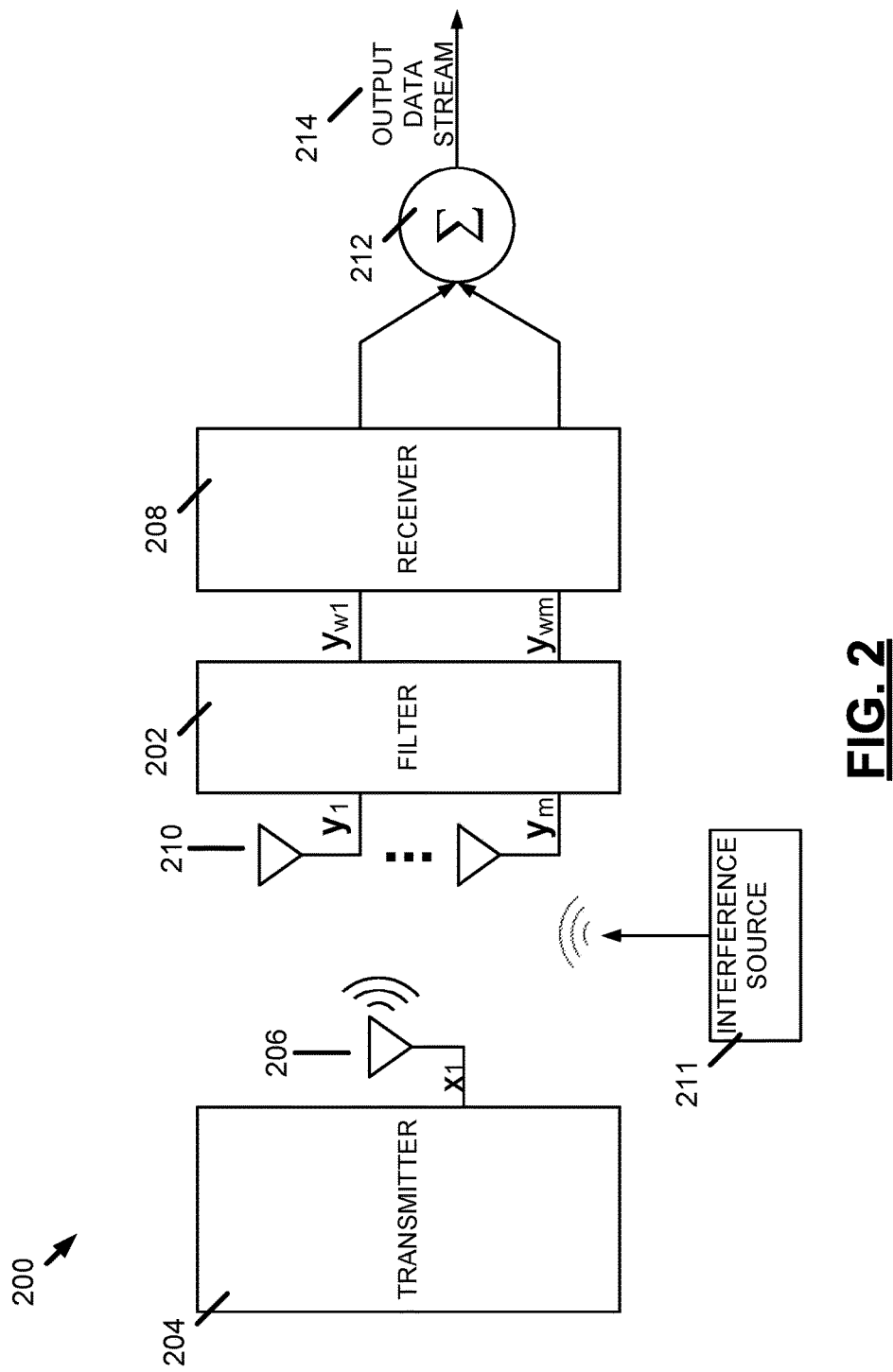
FIG. 2 is a block diagram depicting a SIMO (Single Input Multiple Output) system employing an interference rejection filter to decrease interference in a data signal received by a receiver.

Although FIG. 1 depicts the use of the filter 102 to suppress interference in the context of a MIMO (Multiple Input Multiple Output) system having multiple transmission antennas 110 at the transmitter 108, a similar interference rejection filter is applied in the context of a SIMO (Single Input Multiple Output) system. FIG. 2 is a block diagram depicting a SIMO system 200 employing an interference rejection filter 202 to decrease interference in a signal received at a receiver 208. In the SIMO system 200 of FIG. 2, a transmitter 206 uses a single transmitting antenna 206 to transmit an input signal $x_1$ to the receiver 208 having a plurality of receive antennas 210, where a number of receive antennas 210 is equal to m. FIG. 2 thus depicts a receiving device that includes the filter 202, receiver 208, receive antennas 210, and any processing modules (e.g., channel estimation and equalizer modules) included in the filter 202 or the receiver 208.

Interference at the receive antennas 210 includes interference originating from an interference source 211 that causes signals received at the receive antennas $y_1, \ldots, y_m$ to be modified versus the transmitted signal $x_1$. The filter 202 suppresses the interference at the receive antennas 210 to output filtered versions of the received signals $y_{w1}, \ldots, y_{wm}$ to the receiver 208. An explicit sounding method is used to suppress interference at the receiving device, and the sounding method includes a transmission of one or more sounding packets from the interference source 211 to the receiving device. In an example where the interference source 211 includes n transmit antennas, the one or more sounding packets include data for each antenna of the n transmit antennas. The receiving device determines a full-dimensional, m-by-n channel estimate for the communication channel between the interference source 211 and the receiving device based on the one or more sounding packets. The filter 202 uses the full-dimensional channel estimate to suppress the interference caused by the interference source 211 at the receive antennas 210. The filtered versions of the received signals, $y_{w1}, \ldots, y_{wm}$, are received at a summation node 212 and combined in a single output data stream 214.

Figure 3:
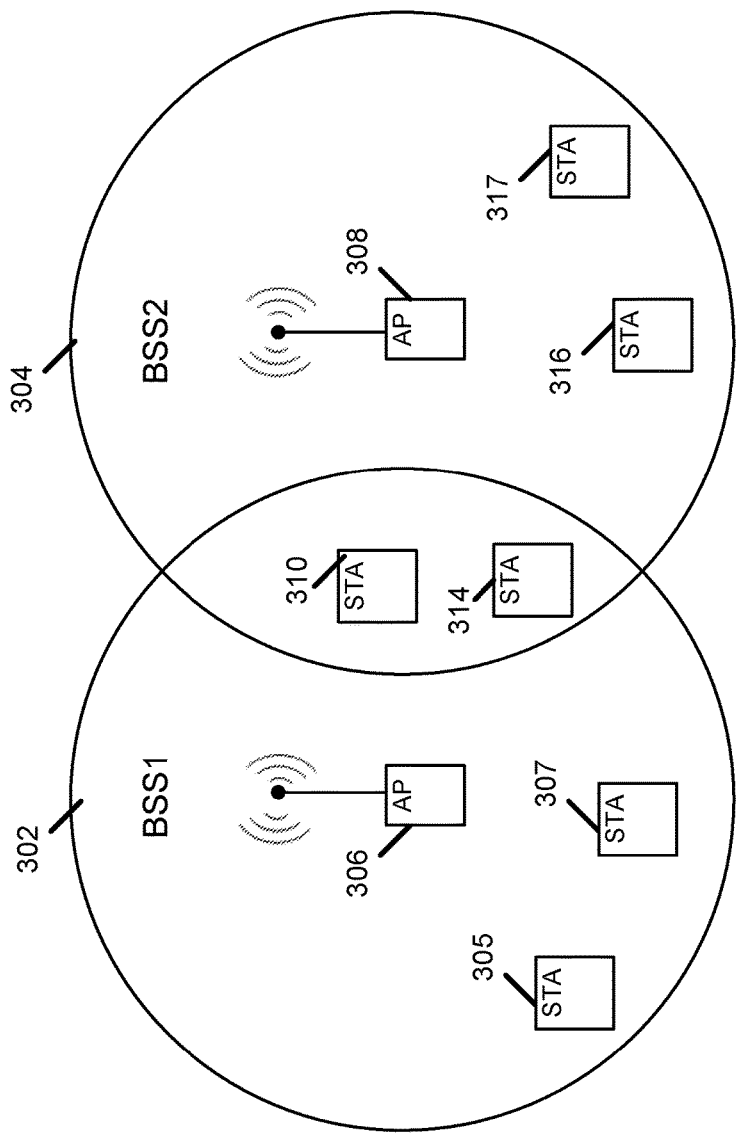
FIG. 3 illustrates overlapping basic service sets (OBSS) that cause co-channel interference (CCI) in a wireless communication system.

FIG. 3 illustrates overlapping basic service sets (OBSS) that cause co-channel interference in a wireless communication system. OBSS collisions occur, for example, when a first access point of a first BSS transmits broadcast or multicast frames, and a second access point of an overlapping second BSS simultaneously transmits frames to one or more particular stations of the overlapping BSS. For instance, as shown in FIG. 3, an OBSS collision occurs when an access point 306 of the BSS 302 transmits broadcast or multicast frames, and an access point 308 of the overlapping BSS 304 simultaneously transmits frames to a station 314 of the BSS 304. In the example of FIG. 3, the access point 306 and stations 305, 307, 310 are part of the BSS 302, and the access point 308 and stations 314, 316, 317 are part of the BSS 304. OBSS collisions are common in areas of densely-deployed WiFi and occur in other scenarios that are not described in detail herein. Co-channel interference caused by OBSS collisions are an issue in communication systems in which frequency reuse is very low (e.g., a system using the 2.4 GHz band in which there are only three 20 MHz channels).

OBSS collisions result in two types of impact. A first type of impact occurs when a station receives unicast packets (e.g., data frames) from a transmitter that is not included in the same BSS as the station. An example of the first type of impact occurs when the station 310 (included in the BSS 302) receives unicast packets from the access point 308 (included in the BSS 304). Specifically, the receipt of the unicast packets at the station from the transmitter included in the different BSS triggers clear channel assessment (CCA) and physical layer (PHY) decoding, with packet processing being stopped at the media access control (MAC) level when MAC address mismatch occurs. The decoding of the MAC information in the unicast packets indicates to the station that the transmitter is included in a different BSS than the station and that the unicast packets were therefore not intended to be sent to the station. Until the transmission of the interfering unicast packets from the transmitter to the station concludes, packet transmission from intended transmitters (e.g., transmitters included in the same BSS as the station) is blocked.

A second type of impact caused by OBSS collisions occurs when a station receives broadcast packets (e.g., management or control frames) from a transmitter that is not included in the same BSS as the station. Such broadcast packets are not intended to be sent to the station, but the station nevertheless receives such packets. An example of the second type of impact occurs when the station 314 (included in the BSS 304) receives broadcast packets from the access point 306 (included in the BSS 302). Specifically, the receipt of the broadcast packets at the station from the transmitter included in the different BSS triggers decoding of the broadcast packets, which causes intended packets to be blocked. A MAC processing component of the station continues to process the broadcast packets that were not intended to be sent to the station until the end of the broadcast packets. Such processing causes a long network allocation vector (NAV) to be set, and the long NAV results in blocking of packets that are intended for the station (e.g., packets from transmitters included in the same BSS as the station).

Figure 4:
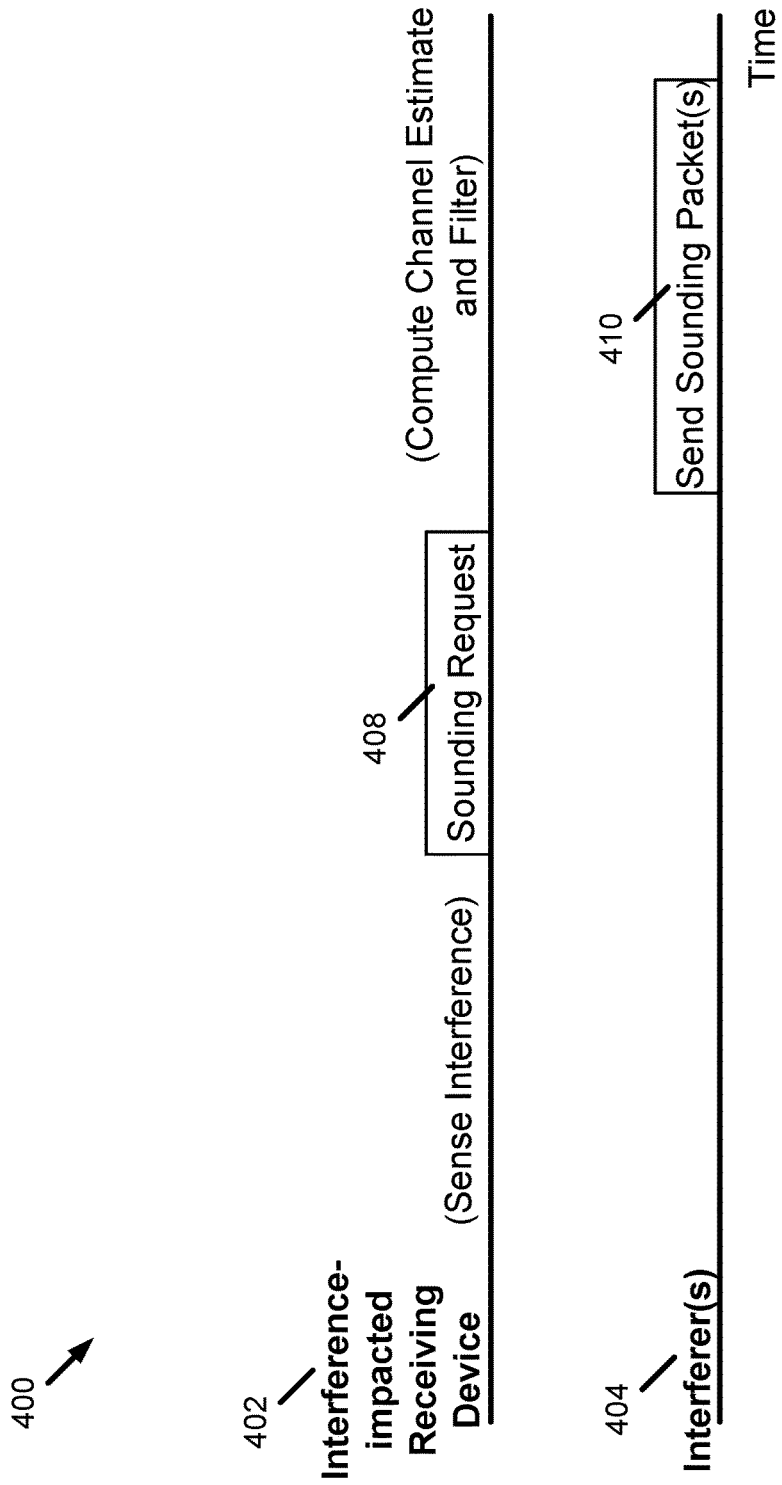
FIG. 4 depicts an example sounding timing diagram.

FIG. 4 depicts an example sounding timing diagram 400. As described above, a technique for suppressing interference from a data signal received at a receiving device utilizes an explicit sounding method. The explicit sounding method allows the receiving device to determine a full-dimensional channel estimate for a communication channel between an interference source and the receiving device. After determining this channel estimate, the receiving device uses the channel estimate to filter future received data signals to reduce an amount of interference caused by the interference source. The sounding timing diagram 400 of FIG. 4 illustrates aspects of such a sounding method. Specifically, the sounding timing diagram 400 illustrates aspects of a "receiver-initiated" sounding method in which a receiving device 402 requests that one or more interferers 404 transmit sounding packets to the receiving device 402.

As illustrated in FIG. 4, when the receiving device 402 senses a great amount of interference, the receiving device 402 sends out a sounding request 408 to the one or more interferers 404. The receiving device is the same as or similar to the receiving devices described above with reference to FIGS. 1 and 2 and includes m receive antennas. The one or more interferers 404 may be, for example, transmitters included in a BSS that is different from that of the receiving device 402 or transmitters that are hidden nodes within the BSS of the receiving device 402. The sounding request 408 includes a Training Request (TRQ) field to indicate that one or more sounding packets are requested and may also include information to coordinate the timing of when the one or more interferers 404 should send sounding packets. The sounding request 408 thus comprises a signal that is transmitted from the receiving device 402 to the one or more interferers 404, with the signal requesting that the one or more interferers 404 transmit one or more sounding packets.

Upon receiving the sounding request 408, each of the one or more interferers 404 transmits the requested one or more sounding packets 410 to the receiving device 402. Each sounding packet 410 includes a training signal set that comprises data for each transmit antenna of n transmit antennas included on a particular interferer of the one or more interferers 404. The training signal set included in the sounding packet 410 includes information sufficient to determine a full-dimensional, m-by-n channel estimate corresponding to the communication channel between the receiving device 402 and the particular interferer. The receiving device 402 receives the sounding packet 410 and uses the sounding packet 410 in determining the full-dimensional channel estimate for the channel. Based on the channel estimate, the receiving device 402 filters future data signals received at the receiving device 402 to suppress the interference caused by the particular interferer.

In an example, the receiving device 402 transmits the sounding request 408 to multiple interferers 404. In such an example, the sounding request 408 is a broadcast frame, and the receiving device 402 uses the sounding request 408 to request that all nearby co-channel stations transmit the one or more sounding packets 410. The interferers 404 that receive the broadcast sounding request 408 respond to the request 408 by transmitting the sounding packets 410 as broadcast frames. In another example, the receiving device 402 transmits the sounding request 408 to a single, particular interferer 404 as a unicast frame. In this example, the receiving device 402 is able to identify a source address of the particular interferer 404 (e.g., by decoding a packet received at the receiving device 402 from the particular interferer 404, where the packet is one that the interferer did not intend to send to the receiving device 402). After identifying the source address of the particular interferer 404, the receiving device 402 transmits the sounding request 408 to the particular interferer 404, requesting that the particular interferer 404 transmit the sounding packet 410 to the receiving device 402. Only the single, particular interferer 404 transmits the sounding packet 410 to the receiving device 402 upon receiving the unicast sounding request 408.

The example of FIG. 4 illustrates aspects of a receiver-initiated sounding method, but in other examples, an interferer-initiated sounding method is used. In the interferer-initiated sounding method, the receiving device 402 does not request that the one or more interferers 404 transmit sounding packets 410, such that the one or more interferers 404 transmit sounding packets 410 without prior prompting from the receiving device 402. In an example of the interferer-initiated sounding method, an interferer 404 sends out sounding packets 410 on a periodic basis, without prior prompting from the receiving device 402. In this example, the period is relatively long, such that a throughput of the interferer 404 is not significantly affected by the periodic transmission of the sounding packets 410. In this example, the sounding packets 410 include media access control (MAC) information indicating that the sounding packet 410 is a broadcast or multicast frame. The indication of the broadcast or multicast frame is used because the sounding packets 410 are not intended to be transmitted to only the receiving device 402, and there is no designated recipient for the sounding packets 410.

In the interferer-initiated sounding method, the receiving device 402 receives the sounding packet 410 and decodes the MAC information included therein. Based on the decoded MAC information, the receiving device 402 determines if the interferer 404 that sent the sounding packet 410 is configured to transmit regular packets to the receiving device 402. The receiving device 402 makes this determination based on the source address (SA) or BSS identifier (BSS-ID) included in the MAC information. In an example, based on the SA or BSS-ID, the receiving device 402 determines that the interferer 404 is included in a BSS that is different from that of the receiving device 402 and that the interferer 404 is therefore not configured to send regular packets to the receiving device 402. Upon making the determination that the interferer 404 is not configured to send regular packets to the receiving device 402, the receiving device 402 identifies the interferer 404 as a source of interference.

Additional processing is performed by the receiving device 402 based on the determination that the interferer 404 is not configured to send regular packets to the receiving device 402. In an example, the receiving device 402 determines a signal strength of the signal that was used in transmitting the sounding packet 410. If the signal strength is high, the receiving device 402 identifies the interferer 404 as a major source of interference and subsequently uses the sounding packet 410 in determining the full-dimensional channel estimate and performing interference avoidance based on the channel estimate. If the signal strength is low, the receiving device 402 determines that the interferer 404 is not a major source of interference. In such instances, the receiving device 402 does not use the sounding packet 410 in performing interference-avoidance filtering.

The receiving device utilizes the signal strength measurement and determines whether the signal strength is high or low based on a number of different approaches. In an example, the receiving device 410 determines the full-dimensional channel estimate and performs the interference-avoidance filtering based on a determination that the signal strength exceeds a predetermined threshold. In another example, the receiving device 402 receives sounding packets 410 from multiple different interferers 404, and based on a comparison of the signal strengths of the different sounding packets 410, the receiving device 402 identifies one or more of the multiple interferers 404 as being major sources of interference. The receiving device 402 calculates full-dimensional channel estimates for all of the determined major sources of interference and performs the interference-avoiding filtering based on the channel estimates.

As described above, the one or more interferers 404 may periodically transmit sounding packets 410 without prior prompting from the receiving device 402. In another example of the interferer-initiated sounding method, an interferer of the one or more interferers 404 transmits sounding packets 410 only when the interferer determines that an environment of the interferer includes a large amount of interference. This determination is made based on self-measurements taken by the interferer or based on BSS coordinations. For example, access points within a BSS exchange information about collisions and other interference data, and the interferer uses such information in determining that the environment of the interferer includes a large amount of interference. In an example, the interferer transmits the one or more sounding packets 410 based on a determination by the interferer that the environment of the interferer has a level of interference that exceeds a threshold.

A variety of different packet formats are used for the sounding packets. In each of the different formats, physical layer training fields (e.g., long training fields described in further detail below with reference to FIGS. 5-7) are used by the receiving device to determine a full-dimensional channel estimate for the communication channel between the interferer and the receiving device. Aside from the physical layer training fields used in training the full-dimensional channel, each sounding packet also includes i) an indication of the purpose of the sounding (i.e., performing interference avoidance at the receiving device using signal processing approaches, in contrast to performing transmit beamforming at a transmitter), and ii) media access control (MAC) information including a source address (SA) of the interferer and an identifier (BSS-ID) for a basic service set in which the interferer is included.

Figure 5:
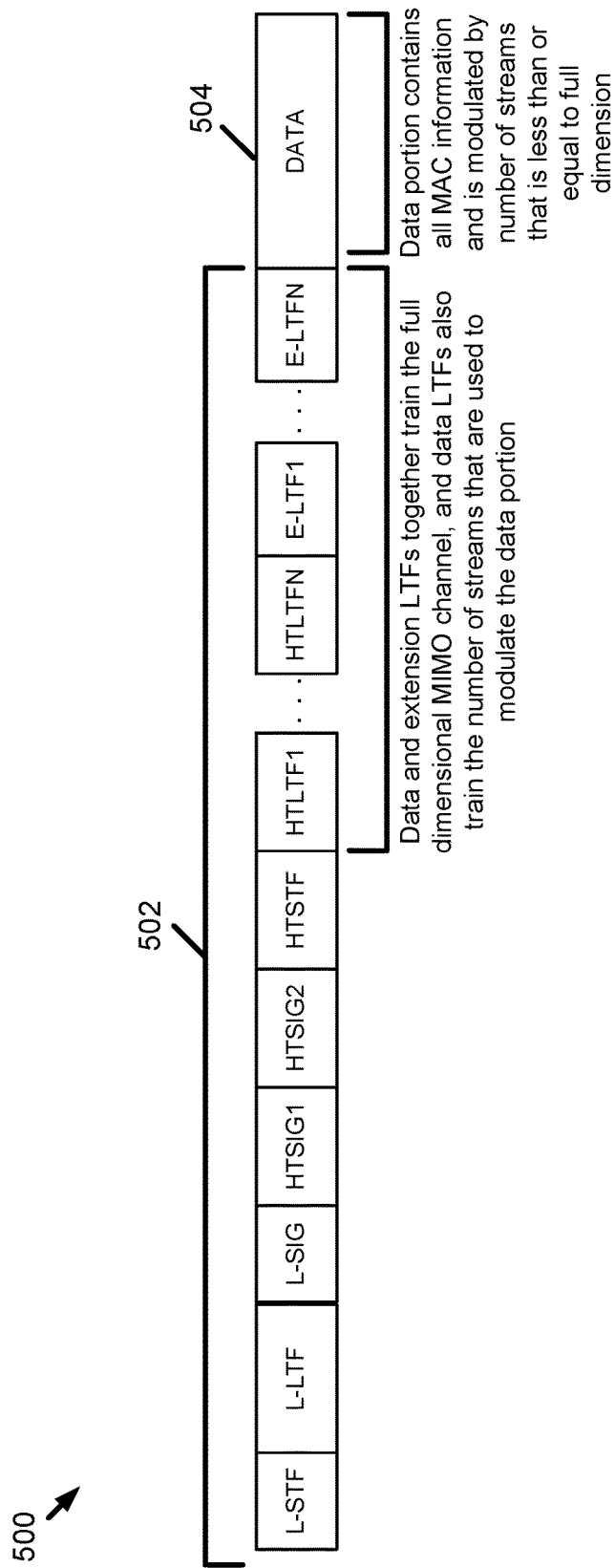
FIG. 5 shows an example of a staggered sounding packet that is transmitted from an interference source to a receiving device.

As a first example of a packet format used in the sounding method disclosed herein, FIG. 5 shows a staggered sounding packet 500 that is transmitted from an interference source to a receiving device. In the example of FIG. 5, the interference source includes n transmit antennas, and the receiving device includes m receive antennas. As illustrated in FIG. 5, the staggered sounding packet 500 includes a preamble 502 and a data portion 504. The preamble 502 includes a Legacy Short Training Field (L-STF), Legacy Long Training Field (L-LTF), and Legacy Signal Field (L-SIG). The preamble 502 further includes one or more High Throughput (HT) fields such as HT Signal Field (HTSIG), HT Short Training Field (HTSTF), and HT Long Training Field (HTLTF). The preamble 502 also includes Extended Long Training Fields (E-LTFs). The sounding packet 500 includes an E-LTF for each transmit antenna of the interference source. In some examples, subfield combinations in HTSIG fields signal the number of E-LTFs in the sounding packet 500. The sounding packet 500 also includes the indication of the purpose of the sounding (i.e., interference avoidance at the receiving device) and MAC information for the interference source (e.g., SA and BSS-ID of the interference source).

The long training fields included in the preamble 502 of the staggered sounding packet 500 include data for each of the n transmit antennas of the interference source, such that the receiving device determines a full-dimensional, m-by-n description of the communication channel between the interference source and the receiving device. Specifically, data LTFs (e.g., HTLTFs) and extension LTFs (e.g., E-LTFs) included in the preamble 502 are used together by the receiving device to train the full dimensional MIMO channel. For example, for an access point having four antennas, the preamble 502 includes one data LTF and four extension LTFs to achieve the full-dimensional training. The data LTFs are also used by the receiving device to train the number of streams that are used to modulate the data portion 504 of the packet 500. The data portion 504 of the packet 500 contains all of the MAC information of the packet 500, and the data portion 504 is modulated by a number of data streams that is less than or equal to full-dimension. The staggered sounding packet 500 has a format that is the same as or similar to that of the IEEE 802.11n staggered sounding format.

Figure 6:
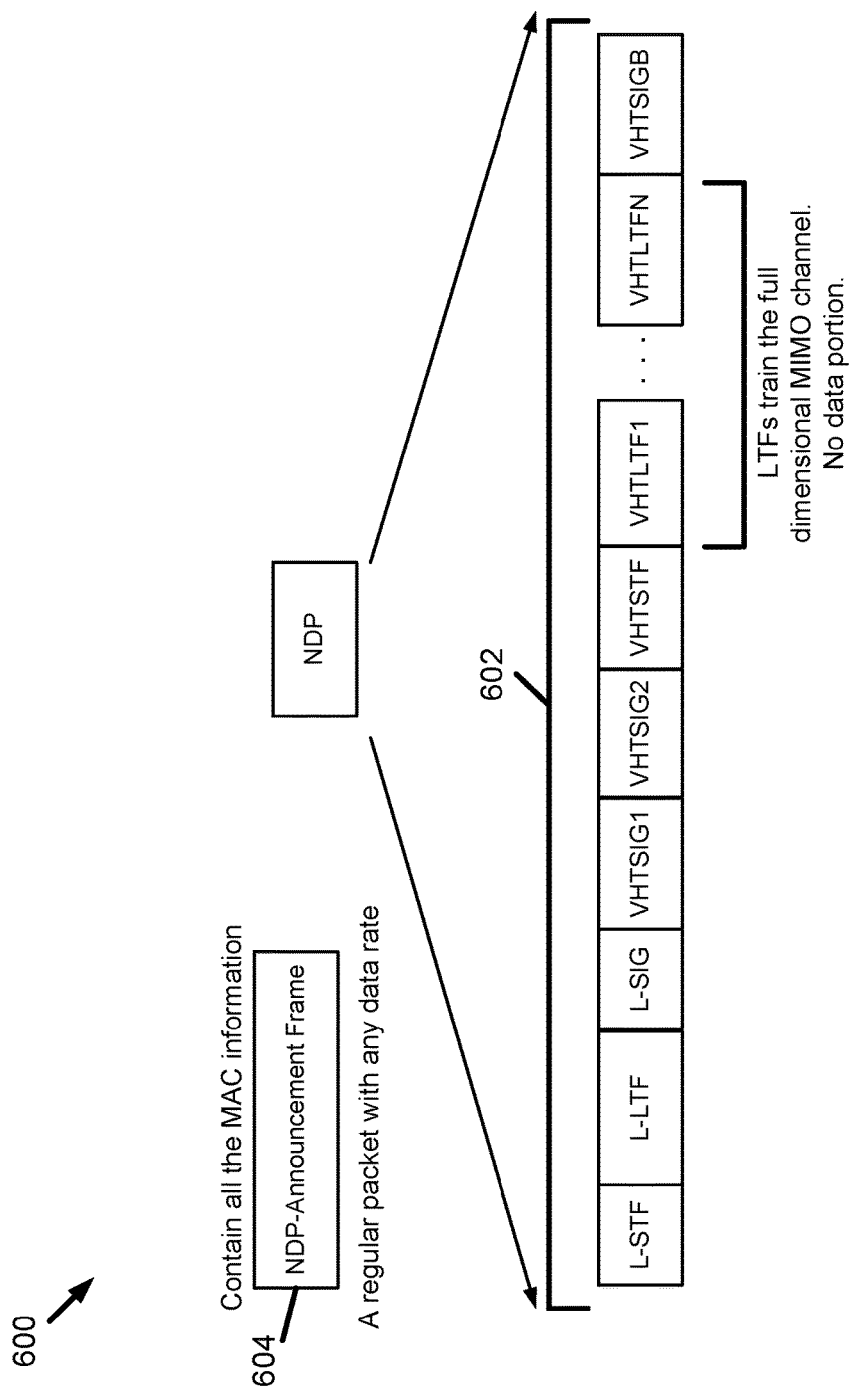
FIG. 6 shows an example of a null data packet (NDP) sounding packet that is transmitted from an interference source to a receiving device.

As another example of a packet format used in the sounding method disclosed herein, FIG. 6 shows a null data packet (NDP) sounding packet 600 that is transmitted from an interference source to a receiving device. In the example of FIG. 6, the interference source includes n transmit antennas, and the receiving device includes m receive antennas. As illustrated in FIG. 6, the NDP sounding packet 600 includes a preamble 602 and does not include a data portion. The preamble 602 includes one or more of L-STF, L-LTF, and L-SIG fields. The preamble 602 also includes one or more Very High Throughput (VHT) fields such as VHTSIG1, VHTSIG2, VHTSTF, and multiple VHTLTFs (i.e., VHTLTF1 . . . VHTLTFN, as illustrated in FIG. 6). Signaling fields in the preamble 602 such as VHTSIG1, VHTSIG2, and VHTSIGB are used to indicate the number of included VHTLTFs. The preamble 602 includes a VHTLTF for each transmit antenna of the interference source. The sounding packet 600 also includes an indication of the purpose of the sounding and MAC information for the interference source.

The long training fields included in the NDP sounding packet 600 include data from each of the n transmit antennas of the interference source, such that the receiving device determines a full-dimensional, m-by-n description of the communication channel between the interference source and the receiving device. Specifically, the VHTLTF fields included in the NDP sounding packet 600 comprise long training fields that are used by the receiving device to train the full dimensional MIMO channel. As illustrated in FIG. 6, an NDP announcement frame 604 contains all of the MAC information of the packet 600, and the NDP announcement frame 604 is a regular packet with any data rate. The NDP sounding packet 600 has a format that is the same as or similar to that of an IEEE 802.11ac NDP sounding sequence.

Figure 7:
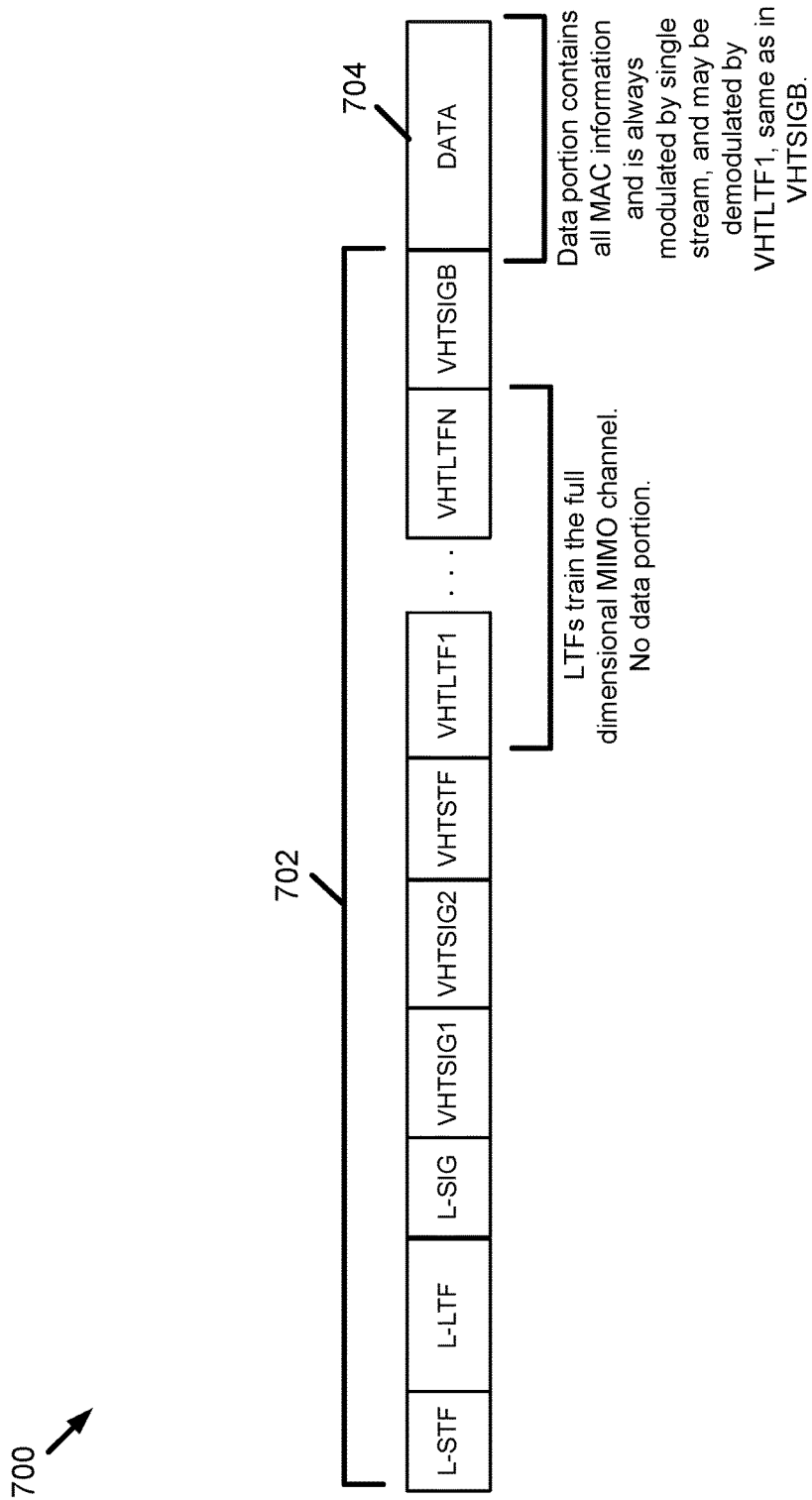
FIG. 7 shows an example of an NDP sounding packet having a data portion that is modulated by a single stream.

As yet another example of a packet format used in the sounding method disclosed herein, FIG. 7 shows an NDP sounding packet 700 having a data portion 704 that is modulated by a single data stream. The NDP sounding packet 700 of FIG. 7 differs from the NDP sounding packet 600 of FIG. 6 because the packet 700 includes the single stream data portion 704, while the packet 600 includes only the preamble 602 and does not include a data portion. In the example of FIG. 7, the interference source includes n transmit antennas, and the receiving device includes m receive antenna. As illustrated in FIG. 7, the NDP sounding packet 700 includes a preamble 702 that includes one or more of L-STF, L-LTF, and L-SIG fields. The preamble 702 also includes one or more VHT fields such as VHTSIG1, VHTSIG2, VHTSTF, and multiple VHTLTFs (i.e., VHTLTF1 . . . VHTLTFN, as illustrated in FIG. 7). Signaling fields in the preamble 702 such as VHTSIG1, VHTSIG2, and VHTSIGB are used to indicate the number of VHTLTFs included in the packet 700. The preamble 702 includes a VHTLTF for each transmit antenna of the interference source. The sounding packet 700 also includes an indication of the purpose of the sounding and MAC information for the interference source.

The long training fields included in the NDP sounding packet 700 include data from each of the n transmit antennas of the interference source, such that the receiving device determines a full-dimensional, m-by-n description of the communication channel between the interference source and the receiving device. Specifically, the VHTLTF fields included in the NDP sounding packet 700 comprise long training fields that are used by the receiving device to train the full dimensional MIMO channel. As illustrated in FIG. 7, the data portion 704 of the NDP packet 700 contains all of the MAC information of the packet 700, and the data portion 704 is modulated by a single data stream. Because the data portion 704 is modulated by the single stream by default, there is no need to signal in the packet 700 that the data portion is single stream. The data portion 704 of the sounding packet 704 is demodulated based on the VHTLTF1 training field, which is also used in demodulating the VHTSIGB field. The NDP sounding packet 700 has a format that is the same as or similar to that of the IEEE 802.11ac NDP sounding sequence, but the format of the packet 700 of FIG. 7 differs from the IEEE 802.11ac NDP sounding sequence because the packet 700 includes the single stream data portion 704 not included in the 802.11ac sequence.

As explained above, the data portion 704 is modulated by a single data stream. In alternative systems including multiple spatial streams, the VHTSTF fields that contain training sequences corresponding to the multiple spatial streams are mapped to the spatial streams via a matrix P. In an example, the same matrix P is used to modulate the single data streams included in the data portion 704 and the VHTSIGB field of the sounding packet 700. More specifically, in an embodiment, the VHTLTF training fields are mapped to the corresponding spatial streams according to:

$$\text{VHTLTF}^{(k)} = [L_1, L_2, \ldots L_{NLTF}] = Q^{(k)} D^{(k)} [P_{*1}, P_{*2}, \ldots, P_{*NLTF}] S^{(k)}, \quad \text{(Equation 2)}$$

where $Q^{(k)}$ corresponds to spatial mapping of the k-th tone of a VHTLTF training field, $D^{(k)}$ corresponds to a CSD phase shift for the k-th tone, $P_{*1}, \ldots, P_{*NLTF}$ are columns of the mapping matrix P, and $S^{(k)}$ is the k-th tone of a VHTLTF training symbol.

The data portion 704 and the VHTSIGB field of the sounding packet 700 are mapped using one of the columns $P_{*1}, \ldots, P_{*NLTF}$ of Equation 2. In an example, the first column of the P matrix is used to map the data portion 704 and the VHTSIGB field:

$$\text{DATA}^{(k)} = Q^{(k)} D^{(k)} P_{*1} S_{DATA}^{(k)}, \quad \text{(Equation 3)}$$

$$\text{VHTSIGB}^{(k)} = Q^{(k)} D^{(k)} P_{*1} S_{VHTSIGB}^{(k)}, \quad \text{(Equation 4)}$$

where $S_{DATA}^{(k)}$ is the k-th tone of the data portion 704, and $S_{VHTSIGB}^{(k)}$ is the k-th tone of the VHTSIGB symbol. In other embodiments, a different column of the P matrix is used to map the data portion 704 and the VHTSIGB field. Both the data portion 704 and the VHTSIGB field of the sounding packet 704 are demodulated based on the VHTLTF1 field. Therefore, the receiving device buffers VHTLTF1 to demodulate the data portion 704 and the VHTSIGB field, and the receiving device buffers all VHTLTFs to estimate the full dimensional MIMO channel.

In an example, the data portion 704 is modulated by a fixed modulation and coding scheme (MCS), where the fixed MCS is used by default and does not change. MCSO is a single spatial stream MCS that is used for both the data portion 704 and the VHTSIGB field. In other examples, other MCSs are used. In examples where a fixed MCS is used that does not change, a SIGA field of the packet 700 does not indicate a modulation and coding scheme for the sounding packet 700. By contrast, in examples where an arbitrary, changing MCS is used, the SIGA field of the sounding packet 700 indicates the modulation and coding scheme that is used. Additionally, because the data portion 704 is single stream by default, the SIGA field does not indicate a number of streams used for the data portion 704. The SIGA field indicates that the packet 700 is a sounding packet, and the use of such an indication in the SIGA field is in contrast to the 802.11ac standard, where a duration of 0 indicates NDO implicitly. Although the format of the sounding packet 700 is described herein for use in performing interference avoidance at the receiving device, the format of the sounding packet 700 may also be extended for use in performing transmit beamforming at a transmitter.

Figure 8:
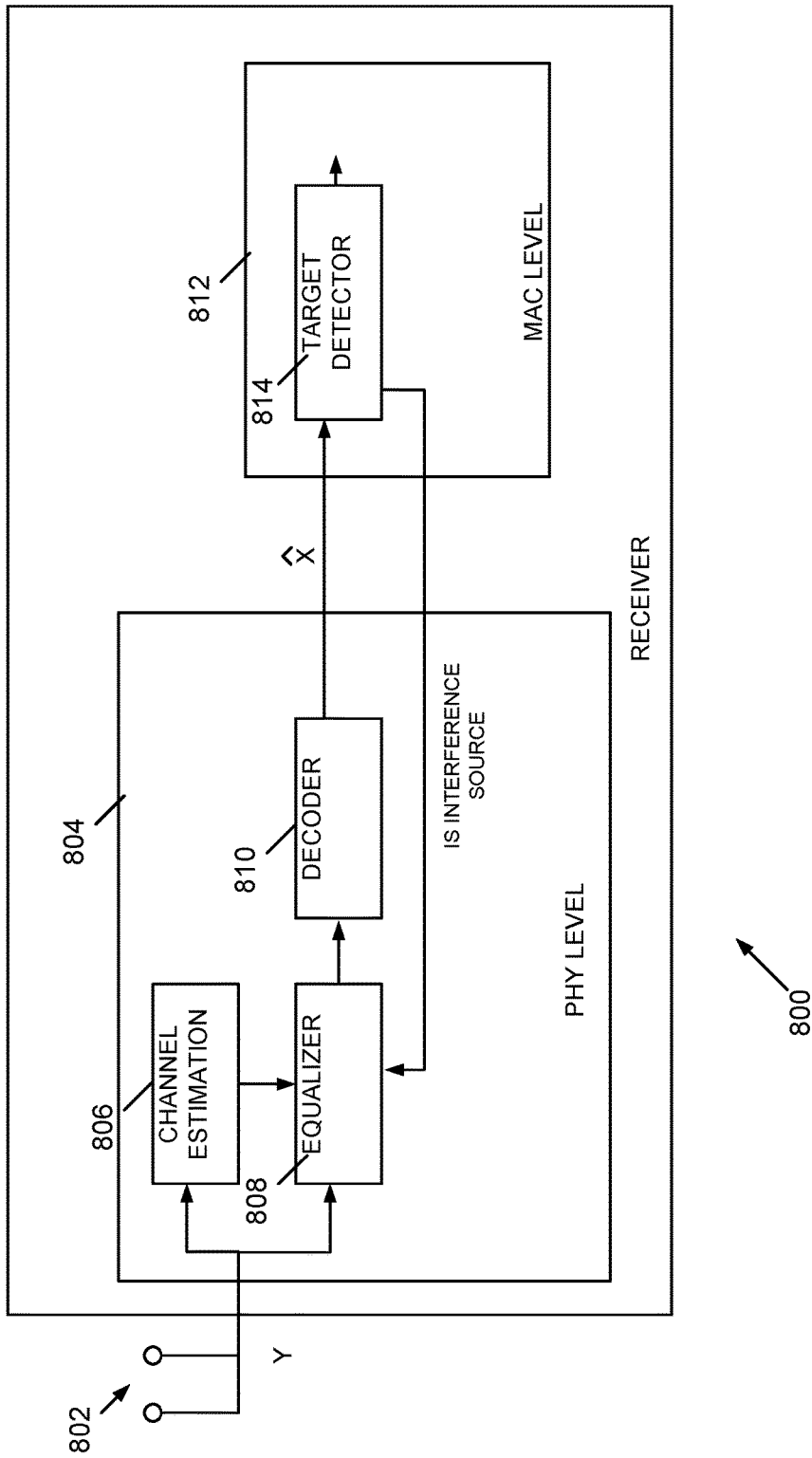
FIG. 8 is a block diagram depicting a receiver including physical layer and media access control layer modules for processing a received data signal to suppress interference in the received data signal.

FIG. 8 is a block diagram depicting a receiver 800 including physical layer and media access control layer modules 804, 812. The receiver 800 receives a data signal via a plurality of antennas 802. The data signal may be a data signal sent by a transmitter that sends regular data packets to the receiver 800 (i.e., a transmitter that is in the same BSS as the receiver 800 and that regularly communicates with the receiver 800) or the data signal may be a data signal including one or more sounding packets from an interferer. Physical (PHY) level processing 804 performs channel estimation 806 and equalization 808 associated with the received data signal. For example, if the data signal includes a sounding packet from an interferer, the channel estimation 806 determines the full-dimensional channel estimate for the communication channel between the interferer and the receiver 800, as described above. Results from the channel estimation 806 are provided to the equalizer 808 for adjustment of the received data signal. An equalizer 808 output is provided to a decoder 810 that generates an estimate of the transmitted data x that is provided to media access control (MAC) level processing 812.

In the MAC level processing 812, a target detector 814 determines whether the source of the data signal is configured to send regular data packets to the receiver 800. The use of the target detector 814 for this purpose is implemented, for example, in the case of the interferer-initiated sounding method described above. In the interferer-initiated sounding method, the receiver 800 does not explicitly request a sounding packet from a transmitter, and the receiver 800 decodes the MAC content of the received data signal to determine if the source of the data signal is configured to send regular packets to the receiver 800. If the target detector 814 determines that the source of the data signal is not configured to send regular data packets to the receiver 800, then the source of the data signal is identified as an interference source. The target detector 814 sends a message to the equalizer 808 noting that the source of the data packet is an interference source. Knowing that the source of the data packet is an interference source and having already determined a channel characteristic associated with the data packet at 806, the equalizer 808 uses that channel characteristic to filter future received data signals to reduce an amount of interference caused by the source of the data packet. If the target detector 814 determines that the source of the data signal is configured to send regular data packets to the receiver 800, then the data x is outputted for downstream processing.

Figure 9:
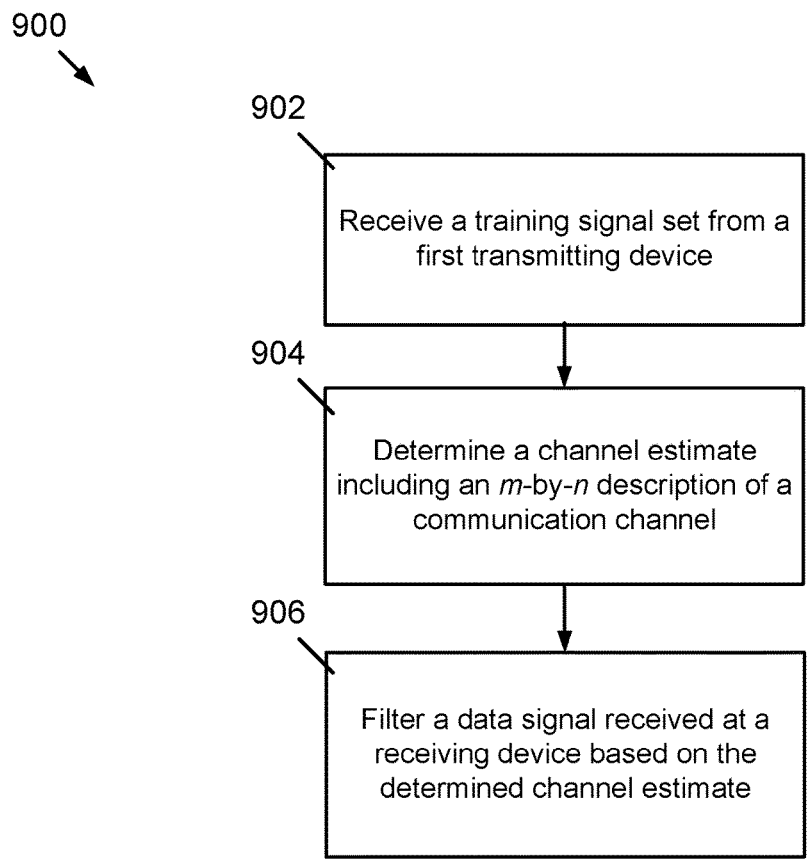
FIG. 9 is a flow diagram depicting an example method for suppressing interference from a data signal received at a receiving device.

FIG. 9 is a flow diagram 900 depicting an example method for suppressing interference from a data signal received at a receiving device, where the receiving device has m receive antennas. At 902, a training signal set transmitted from a first transmitting device is received at the receiving device. The training signal set includes data for each transmit antenna of n transmit antennas included on the first transmitting device. The training signal set includes information sufficient to determine a channel estimate corresponding to a communication channel between the first transmitting device and the receiving device. At 904, the channel estimate is determined based on the received training signal set, where the channel estimate includes an m-by-n description of the communication channel that is determined based on the data for each transmit antenna of the n transmit antennas. At 906, the data signal received at the receiving device is filtered based on the determined channel estimate to suppress the interference in the data signal. The data signal is transmitted from a second transmitting device that is different from the first transmitting device.

While the disclosure has been described in detail and with reference to specific embodiments thereof, it will be apparent to one skilled in the art that various changes and modifications can be made therein without departing from the scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

The invention claimed is:

1. A method comprising:
   receiving, through each receive antenna of m receive antennas of a receiving device, a training signal set transmitted from each transmit antenna of n transmit antennas of a first transmitting device that is a source of interference, wherein
   m and n are each greater than 1,
   the training signal set is included in a null data packet (NDP) sounding packet,
   the NDP sounding packet has a preamble that includes
      a field selected from a legacy short training field (L-STF), a legacy long training field (L-LTF) and a legacy signal field (LSIG), and
      a very high throughput long training field (VHTLTF) for each transmit antenna and a signaling field indicating the number of VHTLTEs;
   determining, from the training signal set, a channel estimate for a communication channel between the first transmitting device and the receiving device, wherein the channel estimate includes m-by-n description of the communication channel based on the data for each transmit antenna of the n transmit antennas;
   receiving, by the receiving device, a data signal from a second transmitting device; and
   filtering, based on the determined channel estimate, the data signal to suppress interference injected b the first transmitting device in the data signal transmitted by the second transmitting device.

2. The method of claim 1, wherein the preamble includes an NDP announcement frame that contains media access control (MAC) information for the first transmitting device, and the NDP sounding packet does not include a data portion.

3. The method of claim 1, wherein the NDP sounding packet includes a data portion that includes an NDP announcement frame that contains media access control (MAC) information for the first transmitting device.

4. The method of claim 3, wherein the data portion is modulated by a single stream, and the sounding packet does not include a notification that the data portion is modulated by a single stream.

5. The method of claim 1, further comprising:
determining a signal strength of a signal that includes the received training signal set; and
determining whether to perform the filtering of the data signal at least partially based on a determination that the signal strength exceeds a predetermined threshold.

6. The method of claim 1, wherein the training signal set is a first training signal set, and wherein the method further comprises:
determining a first signal strength of a first signal that includes the first training signal set;
receiving, by the receiving device, a second training signal set transmitted from a third transmitting device that is a source of interference;
determining a second signal strength of a second signal that includes the second training signal set; and
determining whether to perform the filtering of the data signal at least partially based on a comparison of the first signal strength relative to the second signal strength.

7. The method of claim 1, further comprising:
the receiving device transmitting a request to the first transmitting device that the first transmitting device transmit the training signal set, despite the first transmitting device not being configured to send regular packets to the receiving device.

8. The method of claim 1, further comprising:
the receiving device transmitting a request to the first transmitting device that the first transmitting device transmit the training signal set, despite the first transmitting device and the receiving device not being part of a common service set.

9. The method of claim 1, wherein the training signal set is not used by the receiving device in communicating with the first transmitting device.

10. The method of claim 1, wherein n is not equal to m, and the channel estimate is based on the equation y=Hx+z, wherein:
y is a data matrix that defines signals received by the m receive antennas,
H is a m-by-n channel matrix that defines characteristics of the communication channel,
x is a data matrix defining signals transmitted by the n transmit antennas, and
z is an interference-and-noise matrix.

11. A receiving device comprising:
m receive antennas, each configured to receive a training signal set transmitted from each transmit antenna of n transmit antennas of a first transmitting device that is a source of interference, and further configured to receive a data signal from a second transmitting device, wherein
m and n are each greater than 1,
the training signal set is included in a null data packet (NDP) sounding packet,
the NDP sounding packet has a preamble that includes
a field selected from a legacy short training field (L-STF), a legacy long training field (L-LTF) and a legacy signal field (LSIG), and
a very high throughput long training field (VHTLTF) for each transmit antenna and a signaling field indicating the number of VHTLTFs; and a channel estimation block configured to determine, from the training signal set, a channel estimate for a communication channel between the first transmitting device and the receiving device, wherein the channel estimate includes an m-by-n description of the communication channel based on the data for each transmit antenna of the n transmit antennas; and
a filter configured to filter, based on the determined channel estimate, the data signal to suppress interference injected by the first transmitting device in the data signal transmitted by the second transmitting device.

12. The receiving device of claim 11, wherein the preamble includes an NDP announcement frame that contains media access control (MAC) information for the first transmitting device, and the NDP sounding packet does not include a data portion.

13. The receiving device of claim 11, wherein the NDP sounding packet includes a data portion that includes an NDP announcement frame that contains media access control (MAC) information for the first transmitting device.

14. The receiving device of claim 13, wherein the data portion is modulated by a single stream, and the sounding packet does not include a notification that the data portion is modulated by a single stream.

15. The receiving device of claim 11, wherein the receiving device is configured to:
determine a signal strength of a signal that includes the received training signal set; and
determine whether to perform the filtering of the data signal at least partially based on a determination that the signal strength exceeds a predetermined threshold.

16. The receiving device of claim 11, wherein the training signal set is a first training signal set, and the receiving device is configured to:
determine a first signal strength of a first signal that includes the first training signal set;
receive a second training signal set transmitted from a third transmitting device that is a source of interference;
determine a second signal strength of a second signal that includes the second training signal set; and
determine whether to perform the filtering of the data signal at least partially based on a comparison of the first signal strength relative to the second signal strength.

17. The receiving device of claim 11, wherein the receiving device is configured to transmit a request to the first transmitting device that the first transmitting device transmit the training signal set, despite the first transmitting device not being configured to send regular packets to the receiving device.

18. The receiving device of claim 11, wherein the receiving device is configured to transmit a request to the first transmitting device that the first transmitting device transmit the training signal set, despite the first transmitting device and the receiving device not being part of a common service set.

19. The receiving device of claim 11, wherein the receiving device is not configured to use the training signal set in communicating with the first transmitting device.

20. A method comprising:
transmitting, by a transmitting device, a training signal set from each transmit antenna of n transmit antennas of the transmitting device, to each receive antenna of m receive antennas of a receiving device, wherein m and n are each greater than 1, the training signal set is included in a null data packet (NDP) sounding packet, the NDP sounding packet does not include a data portion, the NDP sounding packet has a preamble that includes
- a field selected from a legacy short training field (L-STF), a legacy long training field (L-LTF) and a legacy signal field (LSIG),
- a very high throughput long training fields (VHTLTF) for each transmit antenna and a signaling field indicating the number of VHTLTFs, and
- an NDP announcement frame that contains media access control (MAC) information for the first transmitting device.

\* \* \* \* \*